United States Patent [19]

Aron et al.

[11] Patent Number: 5,274,990
[45] Date of Patent: Jan. 4, 1994

[54] HAYMAKING MACHINE HAVING AN ADJUSTABLE DEFLECTOR

[75] Inventors: Jerome Aron, Dossenheim Sur Zinsel; Didier Demanet, Reding, both of France

[73] Assignee: Kuhn, S.A., Saverne Cedex, France

[21] Appl. No.: 911,073

[22] Filed: Jul. 9, 1992

[30] Foreign Application Priority Data

Jul. 11, 1991 [FR] France ................. 91 08926

[51] Int. Cl.⁵ ............... A01D 78/10; A01D 80/00
[52] U.S. Cl. ........................... 56/377; 56/370; 56/396; 56/DIG. 21; 56/DIG. 24
[58] Field of Search .......... 56/366, 370, 377, 376, 56/396, 399, DIG.

[56] References Cited

U.S. PATENT DOCUMENTS

| | | | |
|---|---|---|---|
| 3,527,040 | 9/1970 | Teagle | 56/370 |
| 3,650,101 | 3/1972 | Aron | 56/370 |
| 3,820,314 | 6/1974 | Reber | 56/370 |
| 3,962,854 | 6/1976 | Van der Lely | 56/370 |
| 4,077,189 | 3/1978 | Hering | 56/11.9 |
| 4,144,699 | 3/1979 | Aron | 56/370 |
| 4,149,364 | 4/1974 | Aron | 56/366 |
| 4,166,352 | 9/1979 | Knusting | 56/366 |
| 4,286,427 | 9/1981 | Van der Lely | 56/370 X |
| 4,628,673 | 12/1986 | Aron | 56/370 |
| 4,656,821 | 4/1987 | Aron | 56/370 |
| 4,693,065 | 9/1987 | Aron et al. | 56/377 |
| 4,723,404 | 2/1988 | Aron | 56/370 |
| 4,875,332 | 10/1989 | Aron | 56/377 |
| 4,914,901 | 4/1990 | Aron | 56/370 |
| 4,922,700 | 5/1990 | Aron | 56/370 |
| 4,953,346 | 9/1990 | Aron | 56/11.1 |
| 5,024,053 | 6/1991 | Aron | 56/367 |
| 5,060,465 | 10/1991 | Jerome | 56/367 |

FOREIGN PATENT DOCUMENTS

| | | |
|---|---|---|
| 0316559 | 5/1989 | European Pat. Off. |
| 3328537 | 2/1984 | Fed. Rep. of Germany |
| 2063497 | 7/1971 | France |
| 2355440 | 3/1976 | France |
| 2375814 | 12/1977 | France |
| 2061082 | 5/1981 | United Kingdom |

Primary Examiner—Stephen J. Novosad
Attorney, Agent, or Firm—Oblon, Spivak, McClelland, Maier & Neustadt

[57] ABSTRACT

A haymaking machine, particularly a windrower of cut plants comprises a support mount which is attached to a frame that is adapted to be coupled to a hydraulic power lift of a tractor. At least one raking wheel being connected to one end of the support mount. The haymaking machine further comprises a protective device which extends at least partially around the at least one raking wheel and a deflector which works with the at least one raking wheel and limits a lateral ejection of cut plants. The haymaking machine further includes an adjusting mechanism for adjusting a position of the deflector with respect to the at least one raking wheel. The adjusting mechanism comprising a hydraulic cylinder which is connected to the deflector for changing the position of the deflector with respect to the at least one raking wheel.

13 Claims, 8 Drawing Sheets

HAYMAKING MACHINE HAVING AN ADJUSTABLE DEFLECTOR

BACKGROUND OF THE INVENTION

1. Field of the Invention

The present invention relates to a haymaking machine, particularly a windrower of cut plants, comprising a support mount, at least one raking wheel, a protective device which extends at least partially around the raking wheel and a deflector which works with the raking wheel and whose position in relation to the raking wheel is adjustable.

2. Description of the Related Art

On a known machine of this type, the adjustments of the deflector must be performed by hand. The adjustments have as their object to move the deflector farther away from or closer to the raking wheel, as a function of the volume of the plants present, to form the windrow well and/or to transfer the deflector from the work position to the transport position and vice versa.

These operations require the stopping of the tractor and of the machine and movements on the part of the user. Actually, for each adjustment, the user must get down off the tractor. Consequently, these operations quickly become tiresome and time consuming for the users. For these reasons they are often neglected, which adversely affects the quality of work and is unsafe for the users.

On the other hand, if the width of the machine is considerable, the dimensions of the raking wheel and the protective device must be reduced for transport on the road, in particular. The transfer operations which are necessary for this, as well as those that must be performed to return to the work position, must also be performed by hand. The above-mentioned drawbacks consequently also apply to these operations.

SUMMARY OF THE INVENTION

Accordingly, an object of the present invention is to facilitate the above-mentioned adjustments to improve the quality of work, safety and comfort of use.

For this purpose, a characteristic of the invention is that a hydraulic cylinder is connected to the deflector to change its position. This hydraulic cylinder makes it possible to adjust the distance between the deflector and the raking wheel. The user can control this cylinder from the seat of the tractor. He thus has the capability to position the deflector as a function of the volume of the windrow or to put the machine in a transport position, without it necessitating an interruption of the work.

According to a further characteristic of the invention, the deflector is hinged on an adjusting rod and it comprises stops which work with stops provided on the protective device, to cause the deflector to swing upward, about 180°, when it is moved toward the raking wheel by the hydraulic cylinder. The deflector can thus very easily be transferred above the raking wheel particularly for transport.

According to a further characteristic of the invention, the protective device comprises two lateral parts hinged on a central part by pivot pins directed in the direction of advance, the adjusting rod of the deflector being guided in a tube integral with one of these lateral parts, while the hydraulic cylinder is hinged with one of its ends on the adjusting rod and with its other end on the other lateral part of the protective device. This arrangement makes it possible, by means of the hydraulic cylinder, to position the deflector and the lateral parts of the protective device at the same time. The user can thus control from the tractor the various adjustments of the deflector during work, as well as putting the deflector and the lateral parts of the protective device into the transport position. The return to the work position, which is performed by the same hydraulic cylinder, is also controlled from the tractor.

As a result of all these conveniences, the user will have a tendency to always adjust the machine correctly during work and during transport.

According to a further characteristic of the invention, the hydraulic cylinder comprises an automatic locking and unlocking device. This device makes it possible to prevent any accidental return of the protective device and the deflector from the transport position to the work position.

Accordingly, the present invention provides for a haymaking machine which comprises a support mount; at least one raking wheel connected to one end of the support mount; a protective device which extends at least partially around the at least one raking wheel; a deflector which works with the at least one raking wheel and limits a lateral ejection of cut plants; and adjusting means for adjusting a position of the deflector with respect to said at least one raking wheel. The adjusting means comprising a hydraulic cylinder which is connected to the deflector for changing the position of the deflector with respect to the at least one raking wheel.

BRIEF DESCRIPTION OF THE DRAWINGS

A more complete appreciation of the invention and many of the attendant advantages thereof will be readily obtained as the same becomes better understood by reference to the following detailed description when considered in connection with the drawings, wherein.

DESCRIPTION OF THE PREFERRED EMBODIMENTS

Figure 1:
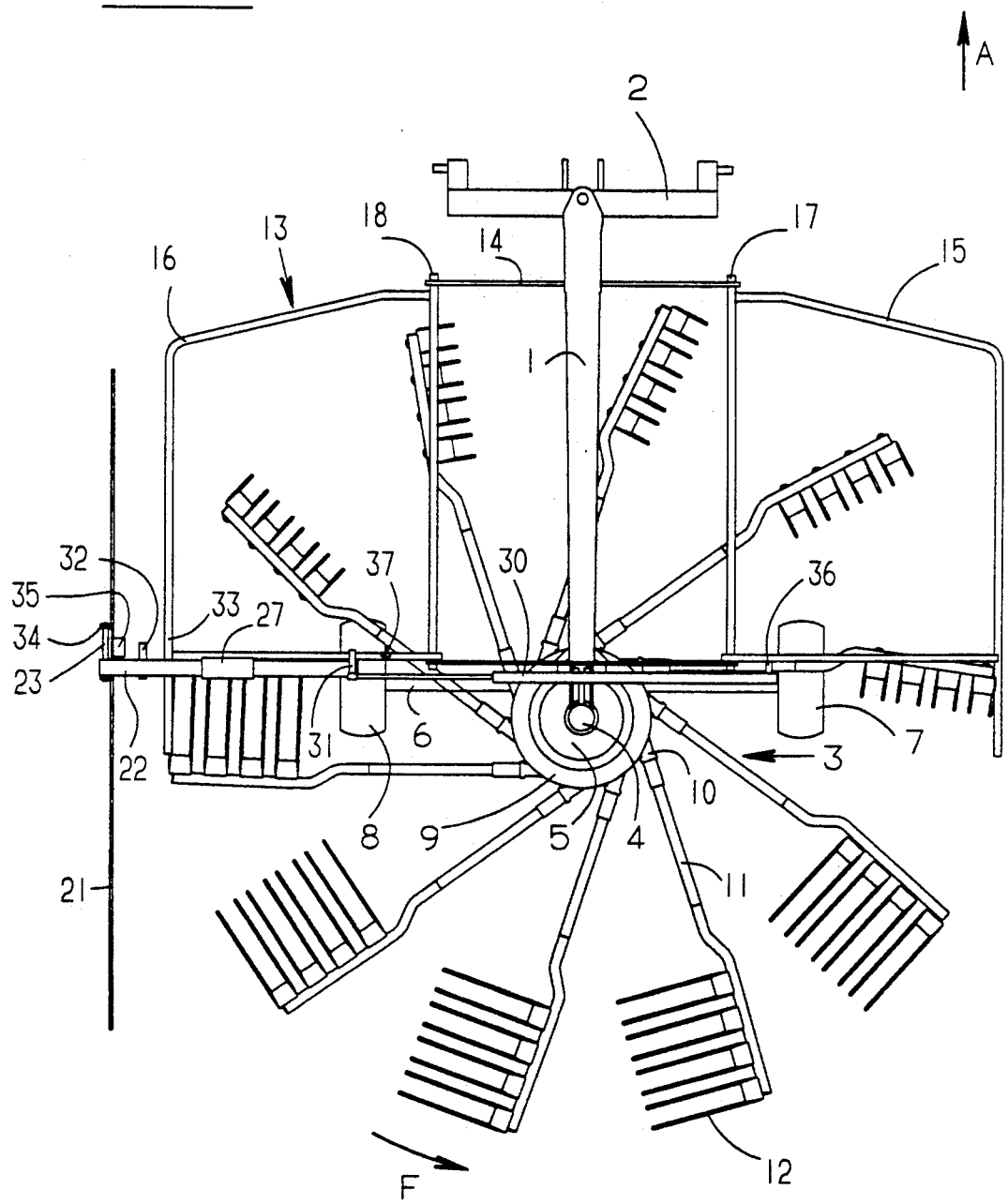
FIG. 1 shows a top view of a machine according to the invention in a work position.

Referring now to the drawings, wherein like reference numerals designate identical or corresponding parts throughout the several views, and more particularly to FIG. 1 thereof, the machine according to the invention comprises a mount (1) in the shape of an approximately horizontal beam. The front end of the mount comprises a frame (2) with three hooking points that are used for coupling to the hydraulic power lift of a tractor, not shown, which is used to drive and move the machine in direction (A). A raking wheel (3) which can be driven in rotation in the direction of arrow (F) is connected to the back end of the mount (1).

The raking wheel (3) is mounted so as to be able to rotate on an approximately vertical support pin (4). The upper end of the pin (4) is housed in a casing (5) which itself is connected to the beam constituting the mount (1). A crosspiece (6) is fastened to the lower end of the pin (4). The crosspiece (6) carries small wheels (7, 8) which move over the ground during work. Raking wheel (3) has a rotary housing (9) which is mounted on support pin (4) by means of ball bearings. The rotary housing (9) is located between casing (5) and crosspiece (6). In its interior volume a control cam is provided which is made integral with the support pin (4). The upper part of the housing (9) is provided with a ring gear. The ring gear meshes with a driving pinion which is fastened to a shaft which extends outside casing (5). It is connected to the power take-off shaft of the tractor by intermediate drive shafts, not shown. The ring gear and its driving pinion are located in the interior volume of casing (5) which provides their protection.

Housing (9) carries on its periphery bearings (10) in which tool-carrying arms (11) are housed in such a way that they can pivot around their longitudinal geometric axes. These arms (11) extend from housing (9) in the form of spokes. At their ends farthest from the housing (9), the arms (11) are provided with tools (12) consisting of raking forks placed side by side. The other ends of the arms (11) are located in housing (9). Each carries a lever provided with a roller which is guided in the control cam which is housed inside the housing (9).

Over the front half of raking wheel (3) a protective device (13) is provided. This device (13) is made up of a central part (14) which is fastened to mount (1) and of two lateral parts (15 and 16) in the shape of trapezoids. These two lateral parts (15 and 16) are hinged on central part (14) by means of pivot pins (17, 18) directed in the direction of advance (A). They can be moved upward around these pivot pins (17, 18), about 90°, for transport. Central part (14) comprises two stops (19 and 20) (FIG. 2) for each lateral part (15 and 16). Lower stops (19) are used to stop lateral parts (15, 16) in the work position, while upper stops (20) are used to stop them in the transport position (see FIGS. 2 and 8). The lateral parts (15 and 16) could, if necessary, be extended backward so as to provide a protection on the back half of raking wheel (3). In this case, pivot pins (17 and 18) could also be extended backward and carry a crosspiece identical to the ones that make up central part (14).

Figure 4:
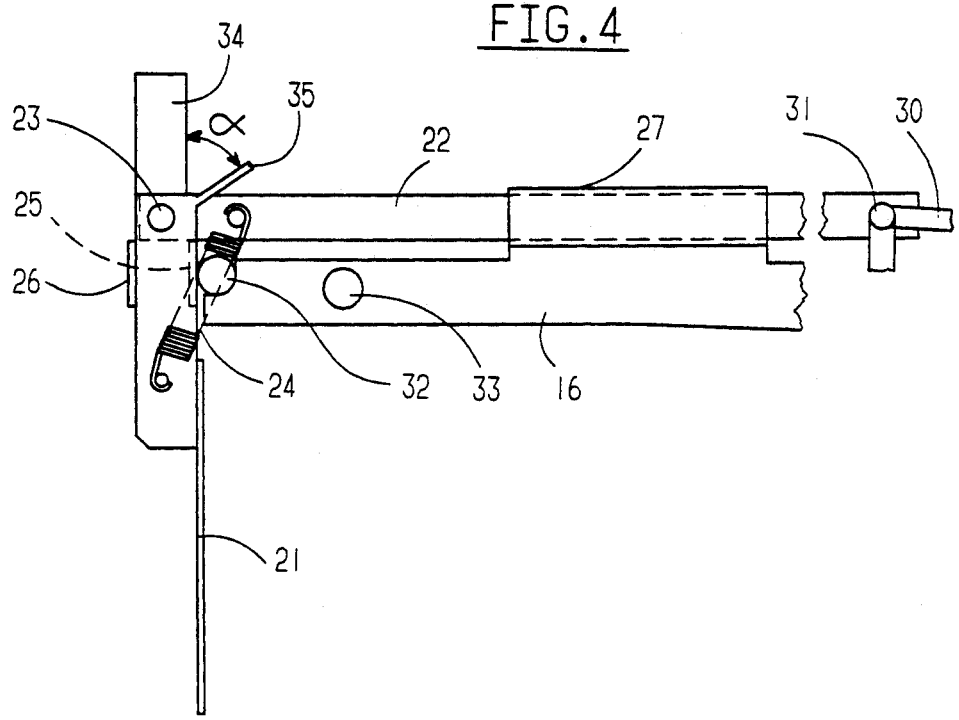
FIGS. 4 to 7 show, on a larger scale, the deflector at different stages when it is being put in the transport position.

A deflector (21) is provided on the side of the machine on which raking wheel (3) deposits the windrow. The deflector (21) comprises a screen made of cloth or of sheet metal or of flexible rods placed side by side. The deflector (21) is fastened to the end of an adjusting rod (22) by means of a hinge pin (23). Between the rod (22) and the deflector (21) a draw spring (24) (FIG. 2) is placed. Its point of attachment on rod (22) is located approximately at the same level as the hinge pin (23), while its point of attachment on deflector (21) is located underneath the hinge pin (23) when the machine is in the work position. Deflector (21) comprises two stops (25 and 26). As illustrated in FIG. 4, stop (25) is located on the side of deflector (21) which is oriented toward raking wheel (3) and the other stop (26) on the opposite side. In the work position, stop (25) is in contact with adjusting rod (22) and keeps deflector (21) in an almost vertical position.

Adjusting rod (22) is guided so as to be able to slide in a tube (27) which is integral with lateral part (16) of protective device (13). In addition, it comprises a roller (28) which is guided in a groove (29) provided in the lateral part (16). A hydraulic cylinder (30) is fastened, by a pin (31), to the end of the rod (22) which is opposite the one on which deflector (21) is fastened. The cylinder (30) is located above raking wheel (3). It is connected to the hydraulic circuit of the tractor and is controlled from it. The cylinder (30) makes it possible to move adjusting rod (22) in tube (27) and consequently to change the position of deflector (21) in relation to raking wheel (3).

Lateral part (16) of protective device (13) comprises two stops (32 and 33). The latter preferably consist of parts having a round section. First stop (32) is located near its edge which is farthest from support pin (4) of raking wheel (3). It is placed under adjusting rod (22) and it is closer to the ground than hinge pin (23) of deflector (21) on the adjusting rod. Second stop (33) is also integral with lateral part (16) of protective device (13). It is slightly closer to support pin (4) of raking wheel (3) than first stop (32) and is also slightly closer to the ground than the latter (see FIGS. 2 and 3).

Deflector (21) comprises two stops (34 and 35) located on opposite sides in relation to hinge pin (23). One stop (34) extends approximately in the extension of deflector (21). Its length measured from the pin (23) is equal to or greater than the distance between the two stops (32 and 33) provided on protective device (13).

The other stop (35) extends in a plane which is approximately radial in relation to hinge pin (23) of deflector (21). It is located on the side of raking wheel (3), when deflector (21) is in the work position, and forms and angle α, of about 45°, with the other stop (34). Its length is less than the distance between the two stops (32 and 33) of protective device (13) (see in particular FIG. 4).

As illustrated in FIGS. 1 to 3 and 8, the other end of hydraulic cylinder (30) is connected to the second lateral part (15) of protective device (13) by a pin (36). The latter is located so that it is underneath a plane P passing through pivot pins (17 and 18) of the two lateral parts (15 and 16), when they are in the work position. First lateral part (16) of protective device (13) comprises a hook (37). The hook (37) is placed in the path of hinge pin (31) of hydraulic cylinder (30) on adjusting rod (22). It is relatively close to pivot pin (18) of first lateral part (16) and is located above the plane (P) passing through the two pivot pins (17 and 18).

Hydraulic cylinder (30) comprises an automatic locking and unlocking device (38). As illustrated in FIGS. 9 to 14, the/locking and unlocking device (38) is made up of a locking pin (39) which is hinged on body (40) of hydraulic cylinder (30) by a pin (41). Its front end goes beyond the body (40) and comprises two guide ramps (42 and 43) and a V-shaped crosswise opening (44) which work with the end of hinge pin (31) between hydraulic cylinder (30) and adjusting rod (22) of deflector (21). A draw spring (45) is attached to the back end of the locking pin (39) and to body (40) of hydraulic cylinder (30).

Figure 2:
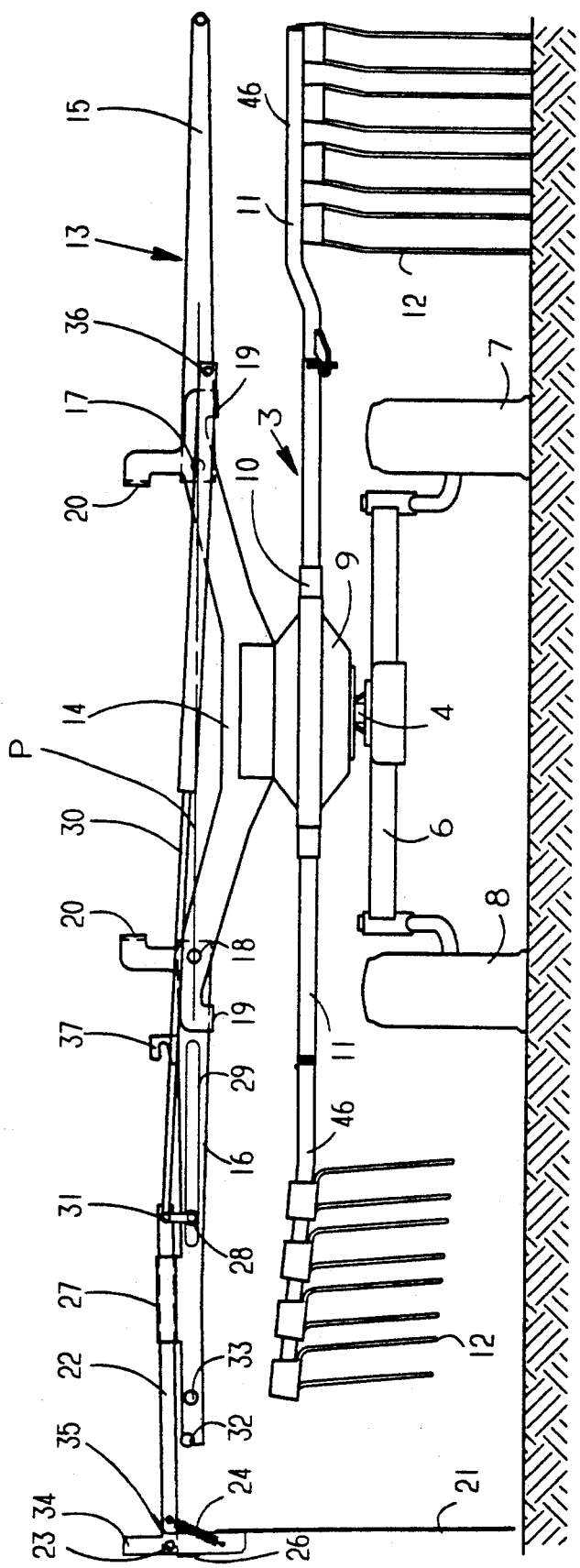
FIG. 2 shows a back view of the machine.

In the work position represented in FIGS. 1 and 2, lateral parts (15 and 16) of protective device (13) are approximately horizontal. They thus prevent the arrival of any obstacle up to tool-carrying arms (11). During the windrowing work, housing (9) which carries tool-carrying arms (11) is driven in rotation around central pin (4), in the direction of arrow (F), from the power take-off shaft of the tractor. The rollers which are connected to the ends of tool-carrying arms (11) are then moved in the guide cam which is located in housing (9). They control the arms (11) in such a way that during each revolution, they pivot around their longitudinal geometric axes, so that in the front part of their path, tools (12) are directed toward the ground and gather the plants laid on the ground and so that in a lateral part of their path, these tools (12) lift up and deposit the gathered plants in the form of a windrow.

During this work, deflector (21) is located on the outer side of the windrow, to limit the lateral ejection of the plants. Due to hydraulic cylinder (30) it can be moved without it being necessary to interrupt the work. Thus, depending on the volume of plants, it can be far from or close to tool-carrying arms (11), to produce well-formed windrows under all conditions.

Hydraulic cylinder (30) also makes it possible to move deflector (21) up to the immediate vicinity of the ends of tool-carrying arms (11) to reduce the width of the machine. This position is represented in FIG. 4. In the case of a machine then having a width within the standards allowed for movements on the road, this position can be used to transport the machine.

Figure 3:
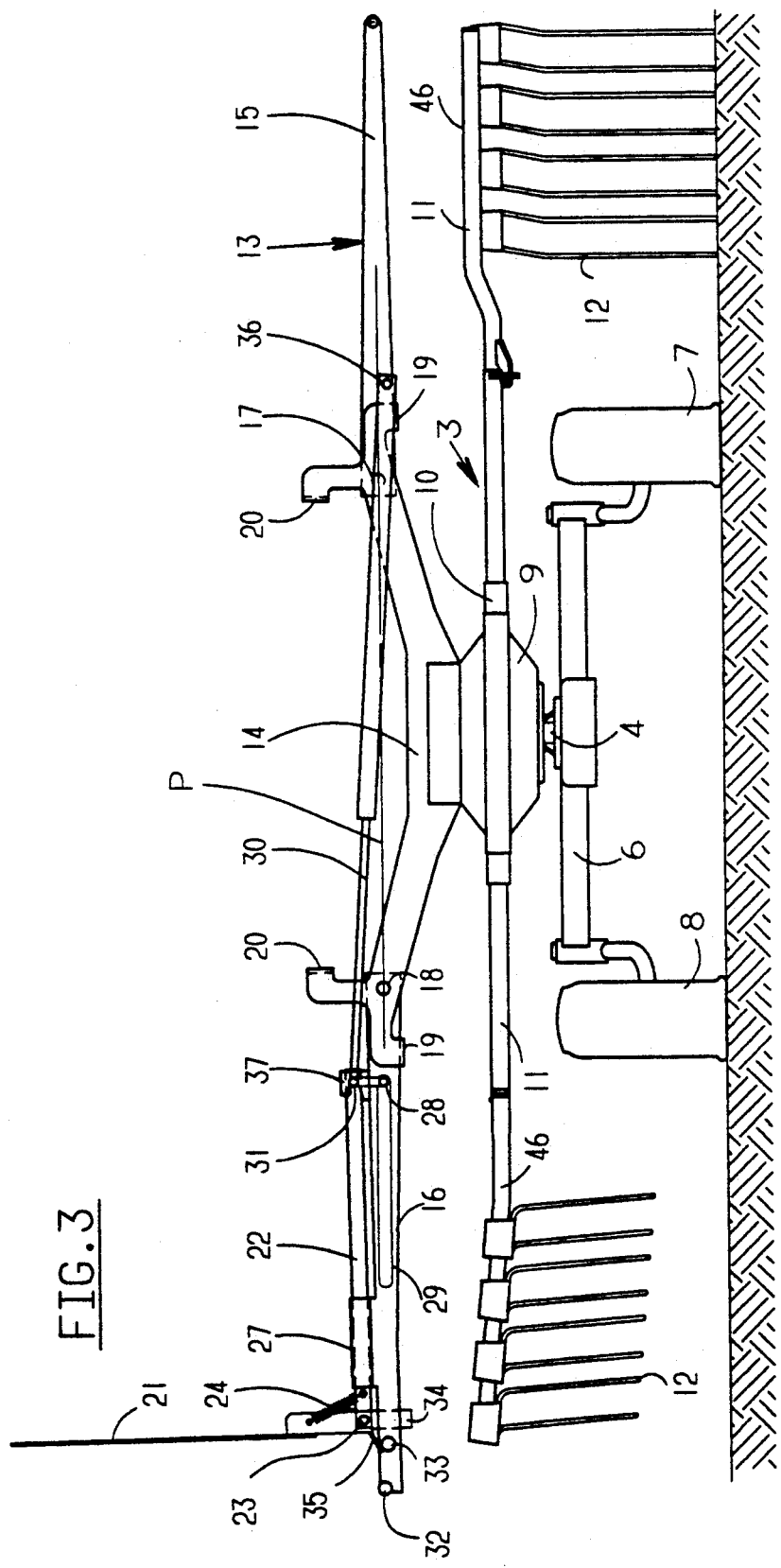
FIG. 3 shows a back view of the machine in a transport position.
Figure 5:
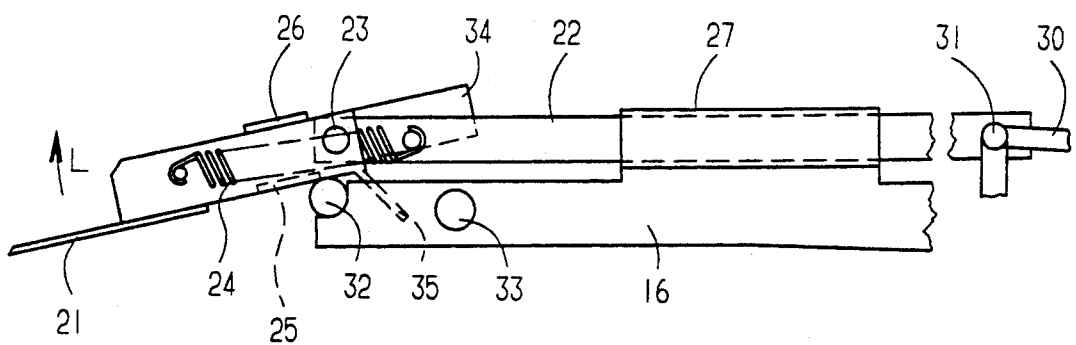

In the case of a machine having a larger width, the same hydraulic cylinder (30) makes it possible to swing deflector (21) above raking wheel (3), for an additional reduction of the width. This position is represented in FIG. 3. For this purpose, it is enough to prolong the shortening action of hydraulic cylinder (30). It then pulls on adjusting rod (22). In a first step, deflector (21) arrives in contact with first stop (32) of lateral part (16) of protective device (13) (see FIG. 4). Then, it pivots around its hinge pin (23) in the direction of arrow (L), as represented in FIG. 5, against the force of spring (24).

Figure 6:
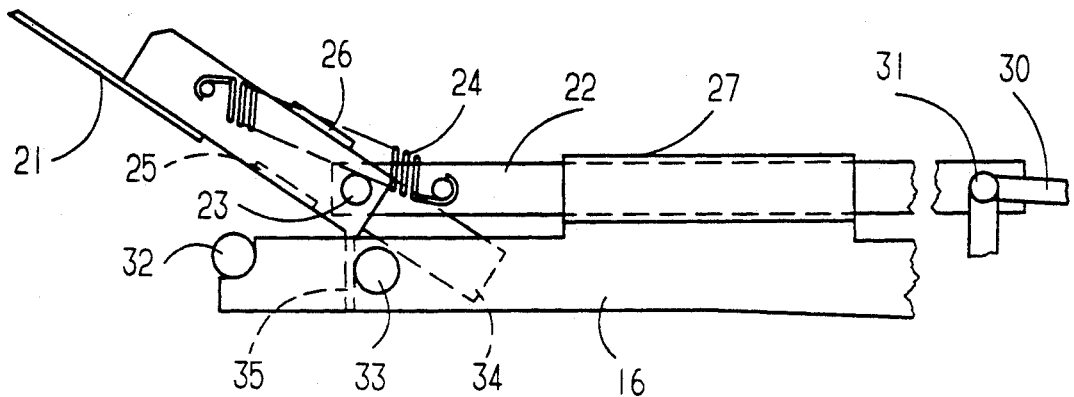
Figure 7:
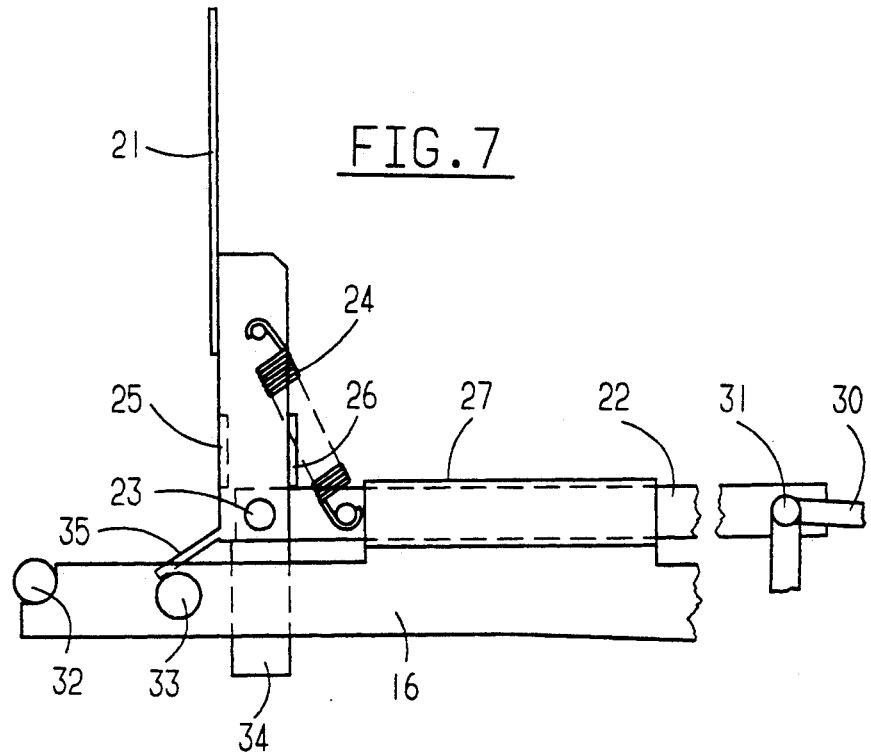

During this pivoting, stop (35) of deflector (21) is engaged between the two stops (32 and 33) of lateral part (16). It is then locked by second stop (33) so that it causes deflector (21) to rotate around its pin (23) until it arrives in an approximately vertical position and is located inside the path described by the outside ends of tool-carrying arms (11) (see FIGS. 6 and 7). It is held in this position particularly by draw spring (24) and stop (26) which presses against adjusting rod (22).

To return to the work position, it is necessary to actuate hydraulic cylinder (30), so that it is extended. Adjusting rod (22) is then moved outward, so that it moves away from support pin (4) of raking wheel (3). Consequently, stop (34) of deflector (21) encounters second stop (33) which holds it. The stop (34) then causes deflector (21) to rotate around its hinge pin (23) in the reverse direction of that of arrow (L) of FIG. 5. During this pivoting, spring (24) is drawn and stop (35) is engaged between the two stops (32 and 33) of lateral part (16). When deflector (21) arrives in an approximately horizontal position, the stop (35) encounters stop (32). The latter holds it and operates so that deflector (21) continues its pivoting around hinge pin (23). Simultaneously, spring (24) pulls on deflector (21). It pivots in this way until it arrives in the approximately vertical position which corresponds to the work position. Hydraulic cylinder (30) then again makes it possible to adjust the distance between deflector (21) and raking wheel (3), as a function of the mass of plants that is located on the ground.

Figure 8:
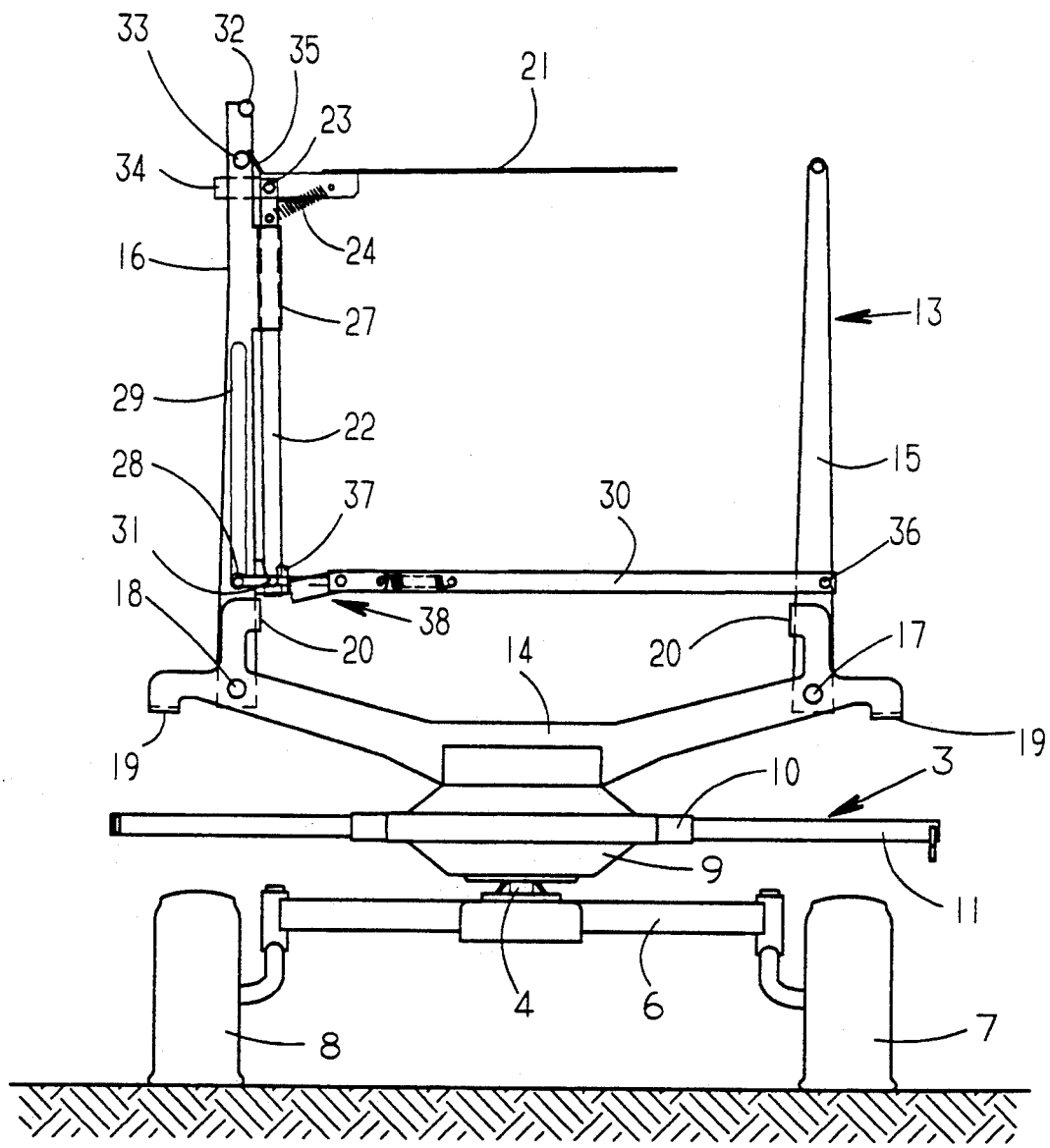
FIG. 8 shows a back view of a machine according to another embodiment, in a transport position.
Figure 9:
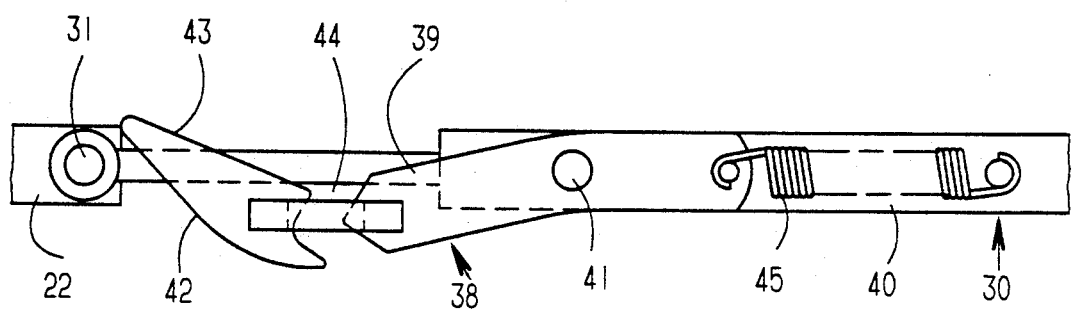
FIGS. 9 to 14 show, on a larger scale, an automatic locking and unlocking device, in different positions.
Figure 10:
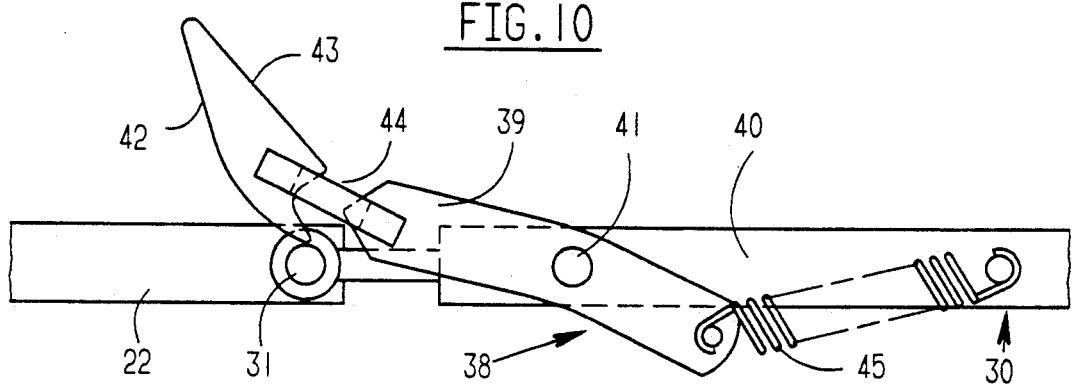
Figure 11:
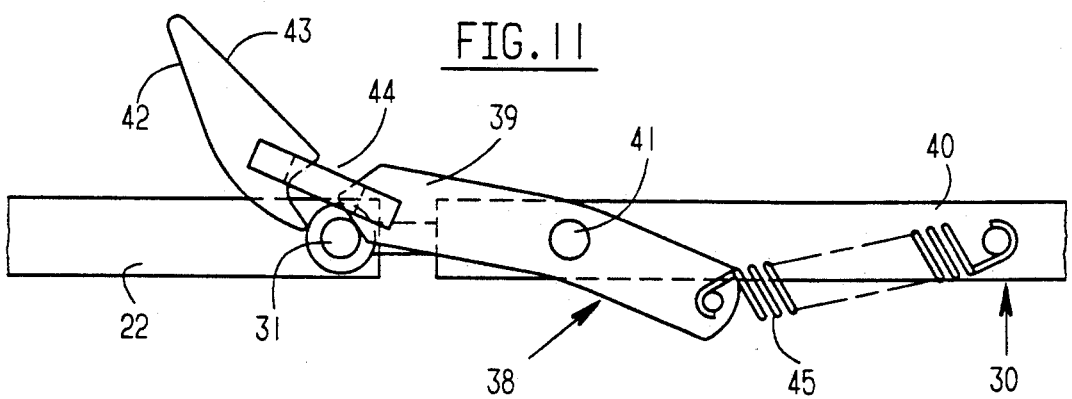

As is represented in the example of FIG. 8, hydraulic cylinder (30) makes it possible to obtain an additional reduction of the width of the machine for transport. Thus, when deflector (21) is in the vertical position above raking wheel (3), as represented in FIG. 3 and described previously, the end of hinge pin (31) between hydraulic cylinder (30) and adjusting rod (22) is located in hook (37) of lateral part (16) of protective device (13). If hydraulic cylinder (30) is continued to be actuated so that it is retracted, the unit consisting of lateral part (16), adjusting rod (22) and deflector (21), is raised around pivot pin (18) of the lateral part (16) on central part (14) of protective device (13). This movement is stopped by stop (20) of the central part (14). At this moment, hydraulic cylinder (30) exerts a pull which is directed upward on the lateral part (15). The latter is thus also moved upward around its pivot pin (17), until it encounters the other stop (20) of central part (14). In this position, the two lateral parts (15 and 16) are directed upward and deflector (21) is located above central part (14). The width of protective device (13) is thus considerably reduced. In this case, tool-carrying arms (11) can comprise outside parts (46) that can be removed to reduce the width of raking wheel (3).

Figure 12:
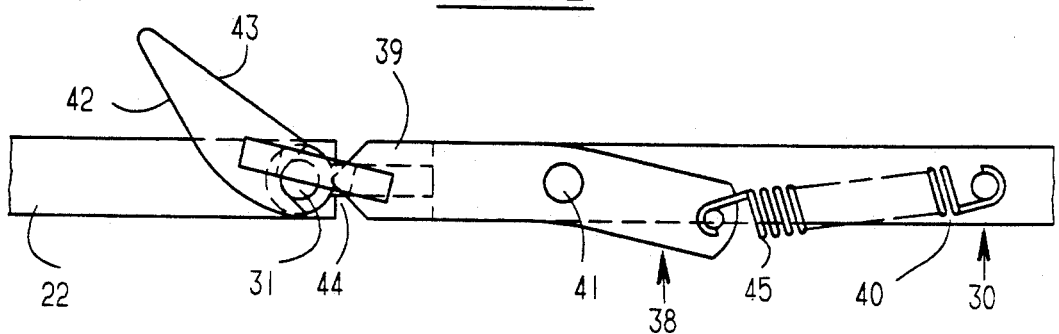

In the position in which the two lateral parts (15 an 16) of protective device (13) are folded upward, hydraulic cylinder (30) is automatically locked by locking device (38). As illustrated in FIGS. 9 to 14, the locking device (38) is actuated by one of the ends of hinge pin (31) between hydraulic cylinder (30) and adjusting rod (22). When, during the positioning for transport, hydraulic cylinder (30) is shortened (FIGS. 9 to 11), the end of pin (31) comes in contact with ramp (42) of locking device (38). It then lifts locking pin (39) around pin (41) until it arrives at opening (44). At this moment, locking pin (39) pivots downward, because of the pull of spring (45), so that the end of pin (31) is located at least partially in opening (44) (see FIG. 11). In this position, the two lateral parts (15 and 16) of protective device (13) are in the transport position. It is enough then to actuate hydraulic cylinder (30) to cause a slight extension to cause the end of pin (31) to enter the point of the V formed by opening (44). In this position, which is represented in FIG. 12, locking pin (39) locks hydraulic cylinder (30) and in particular prevents any accidental extension of it. Therefore, there is no danger of lateral parts (15 and 16) returning to the work position as a result, for example, of a mistaken maneuver on the part of the user or of a leak in the hydraulic circuit which feeds cylinder (30).

Figure 13:
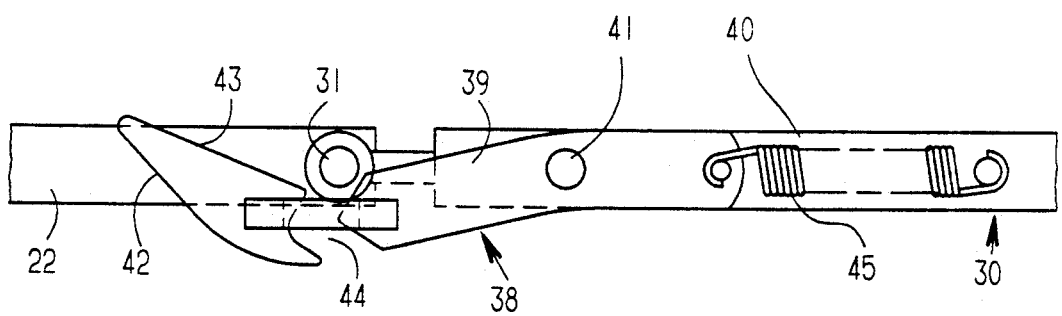
Figure 14:
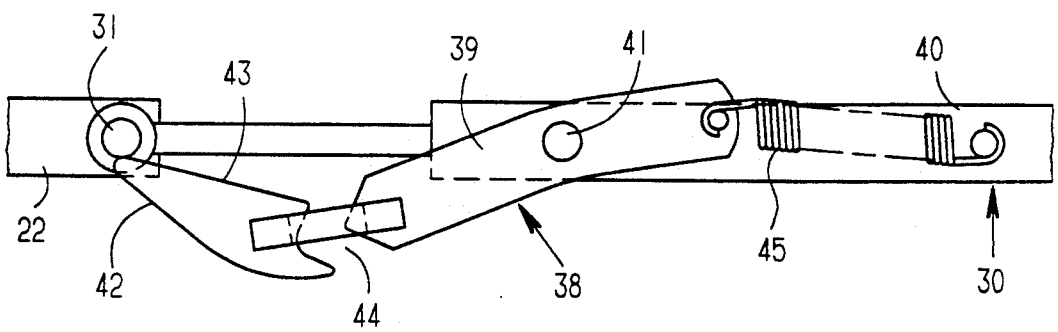

To return to the work position, it is first necessary to actuate hydraulic cylinder (30) for a slight shortening. Hinge pin (31) is then moved toward the center of raking wheel (3). Simultaneously, locking pin (39) is disengaged downward under the action of the pull of spring (45) and frees the end of the pin (31) (FIG. 13). Hydraulic cylinder (30) can then be actuated so that it is extended. In a first step, the end of pin (31) slides over ramp (43) of locking pin (39) and disengages the latter downward (FIG. 14). Then, the two lateral parts (15 and 16) of protective device (13) rotate around their pivot pins (17 and 18) until they arrive in a horizontal position and encounter stops (19). From this moment, hydraulic cylinder (30) again actuates adjusting rod (22) of deflector (21) as has been described above.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A haymaking machine, particularly a windrower of cut plants, comprising:
   a support mount;

at least one raking wheel connected to one end of said support mount;

a protective device which extends at least partially around said at least one raking wheel;

a deflector which works with said at least one raking wheel and limits a lateral ejection of cut plants; and adjusting means for adjusting a position of said deflector with respect to said at least one raking wheel, said adjusting means comprising a hydraulic cylinder which is connected to said deflector for changing the position of the deflector with respect to the at least one raking wheel.

2. The machine according to claim 1, wherein the deflector is hinged by a first hinge pin on one end of an adjusting rod, said pin being directed in a direction of advance (A) of the machine.

3. The machine according to claim 2, further comprising a draw spring located between the adjusting rod and the deflector.

4. The machine according to claim 2, wherein one end of the hydraulic cylinder is connected by a second hinge pin to the other end of adjusting rod.

5. The machine according to claim 4, further comprising means for causing the deflector to swing around the first hinge pin when the deflector is moved by the hydraulic cylinder.

6. The machine according to claim 5, wherein the deflector comprises two stops which are located on opposite sides of the first hinge pin, one of said two stops being directed approximately in an extension of said deflector and the other of said two stops forming an angle α with said one stop.

7. The machine according to claim 6, wherein the protective device comprises first and second lateral parts hinged on a central part by first and second pivot pins which are directed in the direction of advance (A), the adjusting rod being guided on the first lateral part and the other end of the hydraulic cylinder being connected to the second lateral part of the protective device by a third hinge pin.

8. The machine according to claim 7, wherein the third hinge pin of the hydraulic cylinder with the second lateral part of the protective device is located underneath a plane (P) passing through the first and second pivot pins of the first and second lateral parts when the first and second lateral parts are in a work position.

9. The machine according to one of claims 7 or 8, wherein the first lateral part of the protective device comprises a hook for the second hinge pin of the hydraulic cylinder with the adjusting rod of the deflector, said hook is located above a plane (P) passing through the first and second pivot pins of the first and second two lateral parts of the protective device.

10. The machine according to claim 9, wherein the hydraulic cylinder comprises an automatic locking and unlocking device.

11. The machine according to claim 10, wherein the automatic locking and unlocking device comprises a locking pin which is hinged on a body of the hydraulic cylinder and which works with the second hinge pin of the hydraulic cylinder on the adjusting rod of the deflector.

12. The machine according to claim 11, wherein a spring is connected to the locking pin.

13. The machine according to claim 11, wherein the locking pin comprises two guide ramps and a V-shaped opening.

* * * * *